Patented Mar. 9, 1948

2,437,487

UNITED STATES PATENT OFFICE 2,437,487

PROCESS OF REDUCING A METAL OXIDE CATALYST

John W. Teter, Chicago, Ill., assignor to Sinclair Refining Company, New York, N. Y., a corporation of Maine No Drawing. Application October 12, 1944, Serial No. 558,487

5 Claims. (Cl. 252—257)

This invention relates to improvements in the production of catalysts useful for the production of nitrogen-containing organic compounds by the direct amination of olefins with ammonia.

The production of nitrogen-containing products, largely nitriles and amines, by the direct catalytic reaction between ammonia and olefins, particularly propylene and ethylene, in the presence of a catalyst which selectively favors the amination reaction, is described in applications Serial No. 289,186, filed August 9, 1939 (now abandoned), Serial No. 365,561, filed November 13, 1940 (now U. S. Patent No. 2,381,470, dated August 7, 1945), Serial No. 444,094, filed May 22, 1942 (now U. S. Patent No. 2,418,562, dated April 8, 1947), and Serial No. 464,636, filed November 5, 1942 (now U. S. Patent No. 2,381,709, dated August 7, 1945).

In general, the process is carried out by bringing the olefin and ammonia into contact with a catalyst, e. g., a fixed bed catalyst, at high temperatures and pressures, for example, at temperatures of 450 to 750° F. and at high pressures, for example, 500 to 3000 lbs. pressure per square inch.

Catalysts which are useful in the process are the reduced metal oxides, such as nickel, and cobalt, particularly cobalt, deposited on a suitable carrier. Cobalt, promoted by manganese deposited on a carrier such as diatomaceous earth, cobalt silicate, etc., is a particularly advantageous catalyst. Such catalysts are described in applications Serial Nos. 444,095, 444,096 and 444,097, filed May 22, 1942 (now abandoned; now U. S. Patent No. 2,406,929, dated September 3, 1946; and now U. S. Patent No. 2,398,899, dated April 23, 1946; respectively), and Serial No. 489,087, filed May 29, 1943 (now U. S. Patent No. 2,381,473, dated August 7, 1945).

The character of the catalyst, as it reflects the operations by which it has been produced, is of major importance. Thus, catalysts which are improperly calcined, or improperly washed, or otherwise improperly prepared, do not exhibit the high activity characteristic of properly prepared catalyst, nor do they exhibit that degree of selectivity, that is, ratio of nitrogen-containing products to undesirable polymer, such as hydrocarbon polymer, characteristic of a properly prepared catalyst.

While the factors which are responsible for the activity and selectivity of a good catalyst are not fully understood, it appears that the active catalysts require the presence of a small quantity of water, perhaps indicating that the active material involves an equilibrium between metal and oxides, in which water plays a significant part. However, the presence in the catalyst of more than a small quantity of water adversely affects catalyst activity. The amount of water produced during the reduction of the catalyst is far in excess of that which can be included in the catalyst. It also appears that carbon dioxide adversely affects the catalyst activity, and it is important, in the production of an active catalyst, that any carbon dioxide present incident to the decomposition of carbonates or the presence of carbonates be eliminated.

The present invention provides improvements in the reduction of the calcined catalyst to produce the final catalyst which permits the production of catalysts of maximum activity through the elimination of excess water and elimination of carbon dioxide, both being accomplished more effectively than can be accomplished by the simple reduction of the calcined material with hydrogen, as heretofore practiced.

In accordance with the present invention, the calcined catalyst, that is, the material which results from the heating of the initially deposited metal hydroxide or carbonate on the carrier, is reduced in a series of steps involving alternate purging with an inert gas and reduction with hydrogen. The use of ammonia is particularly advantageous for this purpose, but other inert gases, e. g., nitrogen may be used.

By subjecting the catalyst to ammonia purges during the reduction, the removal of water and of carbon dioxide is promoted. The exact mechanism of this phenomenon is not understood. It has been established that purging the catalyst with ammonia removes water which is not removed from the catalyst by the stream of hydrogen used for reduction. This is not due to reduction of the catalyst by ammonia. This removal of water formed during the reduction with hydrogen speeds up the reduction operation, because the equilibrium between metal and metal oxides, which we have deduced is a necessary condition for high catalyst activity, is achieved more rapidly with the increase in the rate of removal of water. Similarly, the ammonia purges facilitate the removal of carbon dioxide from the catalyst.

In practicing the invention, ammonia at high pressure, for example 500 to 3000 lbs. per square inch or more, is advantageously used for the purges. For the reduction, low pressure hydrogen is used at the start, and the hydrogen pressure is increased in the series of steps, alternating with the ammonia purges, which are used, until the final reduction is advantageously carried out with a hydrogen pressure approximating that used in the amination procedure, which may range from 500 to 5000 lbs. per square inch and advantageously, if the product to be aminated is propylene, will be about 3000 lbs.

The temperature of the reduction similarly may be varied over a wide range, from about 450 to about 750° F., and will ordinarily be about that selected for the amination reaction. A very good temperature range for the amination of propylene appears to be about 640–650° F., and in preparing a catalyst for this particular purpose, the reduction is advantageously carried out at about the same temperature, although higher or lower temperatures may be used.

The number of alternating cycles of purging and reduction used in the process may vary from as few as 2 or 3 to as many as 5 or more. A good procedure involves an initial ammonia purge, followed by 4 cycles of reduction followed by purging, with the hydrogen pressure increased progressively for each cycle from a starting pressure of atmospheric to the final pressure, say 3000 lbs. for a catalyst for the amination of propylene.

The period of time required for reduction is substantial. Thus, it may require 100 or more hours of hydrogen reduction to produce an active catalyst. The purging time is much less. Satisfactory purging can be accomplished in 1 hour or so, although longer periods will ordinarily be used so that the rate of passage of ammonia through the mass of catalyst is slow. The following table gives a sequence of operations which yields a highly active catalyst adapted for the amination of propylene at temperatures of 640–650° F. and pressures of 1000–3000 lbs. per square inch for the reduction, at 640° F., of four liters of a pelleted catalyst prepared as described in said applications Serial Nos. 444,095, 444,096, 444,097 and 489,087.

|  | Hours |
|---|---|
| $NH_3$ purge, 3000 lbs. per sq. in., S. V. 1 | 2 |
| $H_2$, atmospheric pressure, 20 cu. ft. per hr | 50 |
| $NH_3$ purge, 3000 lbs. per sq. in., S. V. 1 | 2 |
| $H_2$, 100 lbs. per sq. in., 20 cu. ft. per hr | 25 |
| $NH_3$ purge, 3000 lbs. per sq. in., S. V. 1 | 2 |
| $H_2$, 1000 lbs. per sq. in., 20 cu. ft. per hr | 25 |
| $NH_3$ purge, 3000 lbs. per sq. in., S. V. 1 | 2 |
| $H_2$, 3000 lbs. per sq. in., 20 cu. ft. per hr | 14 |
| $NH_3$ purge, 3000 lbs. per sq. in., S. V. 1 | 6 |

The invention will be further illustrated by the following example, but it is not limited thereto.

*Example.*—87.2 lbs. of a diatomaceous earth (Johns-Manville Cellite #337) was slurried with 80 gallons of a solution of sodium carbonate containing the equivalent of 160 lbs. of anhydrous sodium carbonate. At 90° C. this solution had a gravity of 24° Bé. The slurry was permitted to settle overnight and was then reagitated and its temperature brought to 90° C. by the use of live steam. A solution of cobalt sulfate containing the equivalent of 185 lbs. of anhydrous cobaltous sulfate (70 lbs. of cobalt calculated as metal), with a volume of 80 gallons was then added over a half hour period with intermittent stirring with a high speed propeller type agitator. The catalyst was slurried for 10 minutes after the precipitation was complete and was then pumped to a filter press and filtered. The filter cake was washed with water in the press, was then removed and reslurried with water and again filtered. This procedure was repeated until a total of 5 reslurryings and 5 filtrations had been applied. The filter cake was then dried at 90° C., ground in a cone type crusher to 35 mesh or finer, and calcined for 2 hours at 650° F. in a rotary calciner, gas heated. The calcined product was mixed with 4% of graphite, and pelleted in ¼″ diameter pellets, which were then reground. The densified product which passed a 35 mesh screen was repelleted in ⅛″ diameter pellets and reduced by the following sequence of operations:

|  | Hours |
|---|---|
| $NH_3$ purge, 3000 lbs. per sq. in | 2 |
| $H_2$, atmospheric pressure | 50 |
| $NH_3$ purge, 3000 lbs. per sq. in | 2 |
| $H_2$, 100 lbs. per sq. in | 25 |
| $NH_3$ purge, 3000 lbs. per sq. in | 2 |
| $H_2$, 1000 lbs. per sq. in | 25 |
| $NH_3$ purge, 3000 lbs. per sq. in | 6 |

Results obtained in a typical run are shown in the following table:

| | |
|---|---|
| Temperature °F | 643 |
| Pressure | 1500 |
| Hydrocarbon feed composition, mole per cent: | |
| $C_2$ | } 9.4 |
| $C_2$ | |
| $C_3$ | 47.0 |
| $C_3$ | 42.3 |
| $C_4$ | 1.3 |
| Hydrocarbon feed, moles/hr | 27.74 |
| Ammonia feed, moles/hr | 125.4 |
| $H_2O$: olefin ratio | 0.0182 |
| Space velocity, olefin | 0.108 |
| Per cent nitrogen products, as $C_3=N$ | 25.40 |
| Per cent polymer | 1.52 |

The reduced catalyst is pyrophoric, and if it is to be exposed to air after reduction, and before use, it must be stabilized. Stabilizing of the catalyst is accomplished by purging it after reduction with nitrogen or other inert gas and then slowly introducing nitrogen containing a small amount, for example 1%, of oxygen. Introduction of this gas mixture results in the generation of heat in the catalyst which passes as a heat wave through the whole mass of catalyst. The catalyst bed is then allowed to cool down and nitrogen containing 2 or 3% of oxygen is passed through it. This process is continued with the use of nitrogen containing more and more oxygen until no heat is generated. The catalyst is then regarded as stabilized, that is, it can be safely exposed to the air. At the time of use, such stabilized catalysts can be reduced at a low temperature, for example, 220° F., with a relatively small amount of hydrogen, for example, 5% of that initially required.

I claim:

1. The process of reducing a metal oxide catalyst in which the metal oxide is an oxide of a metal selected from the group consisting of cobalt and nickel to produce a reduced metal oxide catalyst adapted for the catalysis of the direct reaction between ammonia and olefins to produce nitrogen-containing products which includes subjecting the catalyst while at a temperature within the approximate range of 450°–750° F. to a plurality of alternate treatments with ammonia and hydrogen.

2. The process as in claim 1 in which the catalyst is purged with ammonia before being subjected to the action of hydrogen, and is again purged with ammonia after the final treatment with hydrogen.

3. The process as in claim 1, in which the catalytic metal is cobalt.

4. The process of reducing a calcined cobalt oxide catalyst to produce a reduced cobalt oxide catalyst which includes purging the catalyst mass with ammonia, passing hydrogen into contact with said mass at a temperature within the approximate range of 450°–750° F., subjecting said mass at least once more to ammonia purging followed by passing hydrogen into contact with said mass at a temperature within the approximate range of 450°–750° F., and finally purging the mass with ammonia.

5. The process of reducing a metal oxide catalyst in which the metal oxide is an oxide of a metal selected from the group consisting of cobalt and nickel to produce a reduced metal oxide catalyst adapted for the catalysis of the direct reaction between ammonia and olefins to produce nitrogen-containing products which includes subjecting the catalyst while at a temperature within the approximate range of 450°–750° F. to a plurality of alternate treatments with an inert gas and hydrogen said inert gas being a gas selected from the group consisting of nitrogen and ammonia.

JOHN W. TETER.

REFERENCES CITED

The following references are of record in the file of this patent:

UNITED STATES PATENTS

| Number | Name | Date |
|---|---|---|
| 1,320,039 | Ellis | Oct. 28, 1919 |
| 1,329,323 | Ellis | Jan. 27, 1920 |
| 1,483,412 | Claney | Feb. 12, 1924 |
| 1,489,497 | Larson | Apr. 8, 1924 |
| 2,120,958 | Coons | June 14, 1938 |
| 2,267,735 | Ipatieff et al. | Dec. 30, 1941 |
| 2,274,639 | Scheuermann et al. | Mar. 3, 1942 |
| 2,287,891 | Linchk | June 30, 1942 |
| 2,294,414 | Matuszak et al. | Sept. 1, 1942 |
| 2,385,843 | Rennie | Oct. 2, 1945 |